Jan. 18, 1955   H. G. FITZ GERALD   2,699,704
TRANSPARENCY AND PICTURE LIGHT PROJECTING DEVICE
Filed April 30, 1951   3 Sheets-Sheet 3
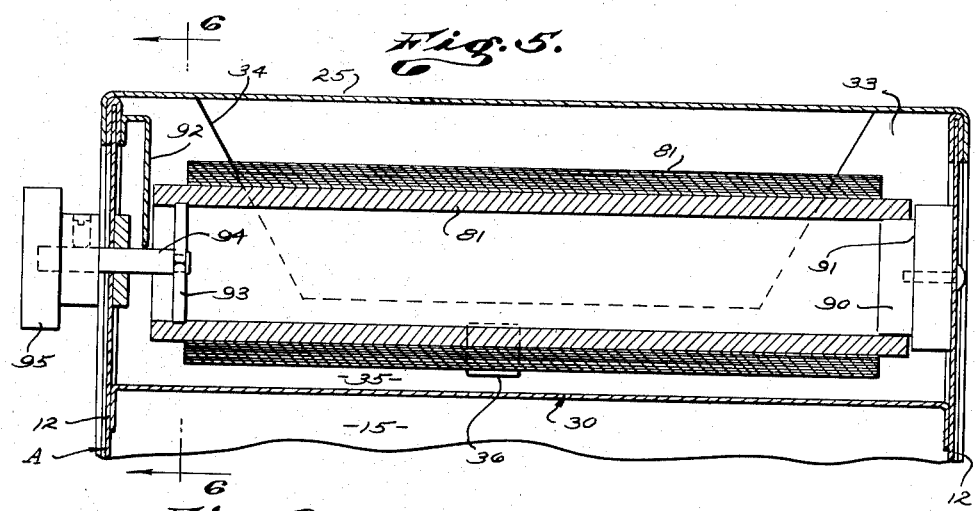
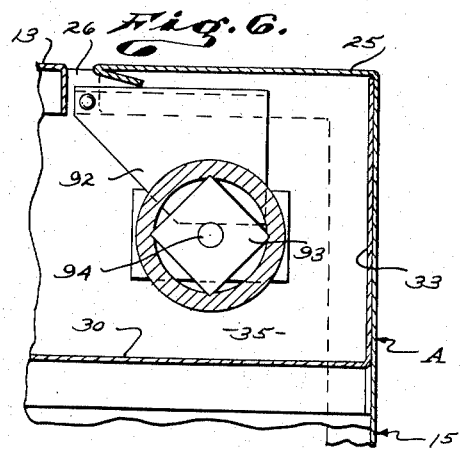 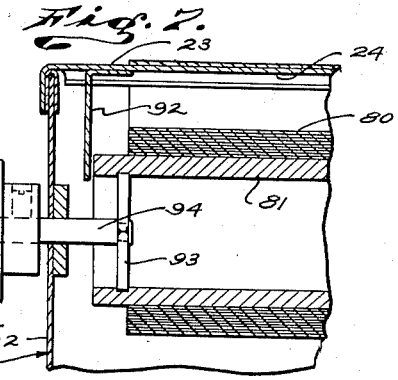
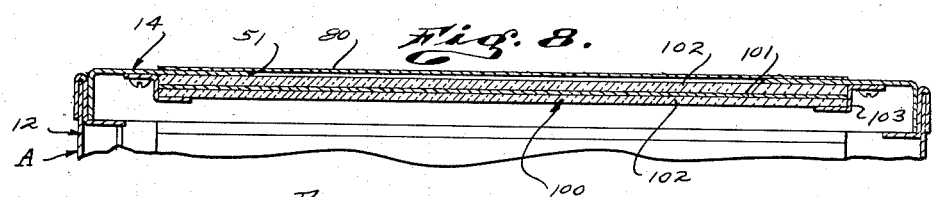
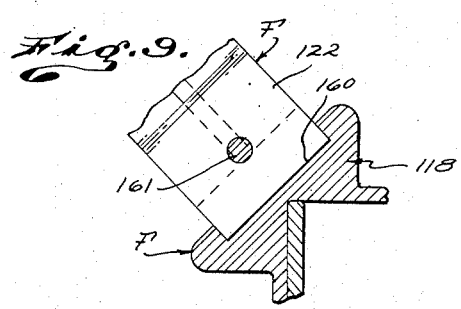
INVENTOR.
Harold G. FitzGerald
BY
Attorney

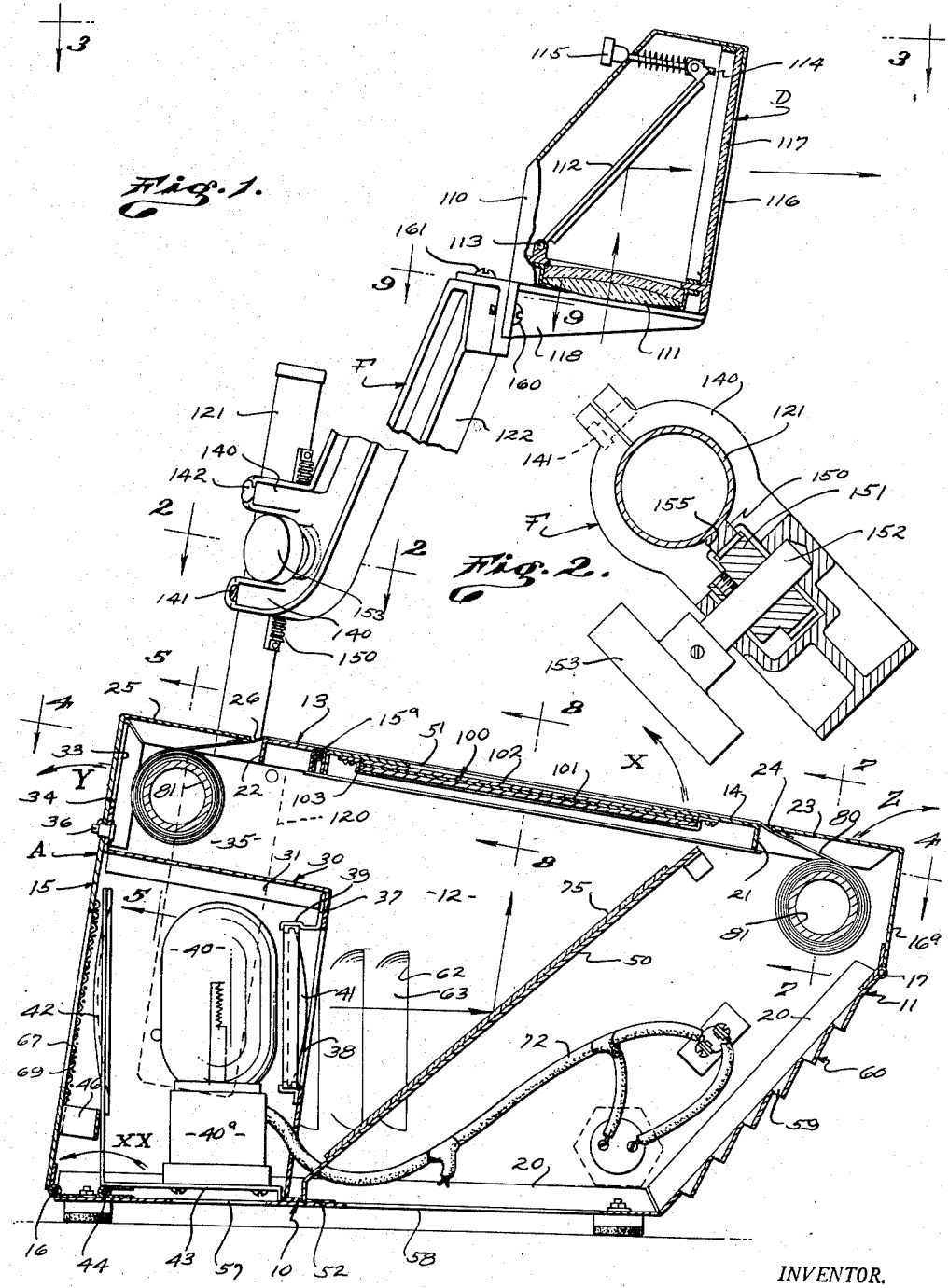

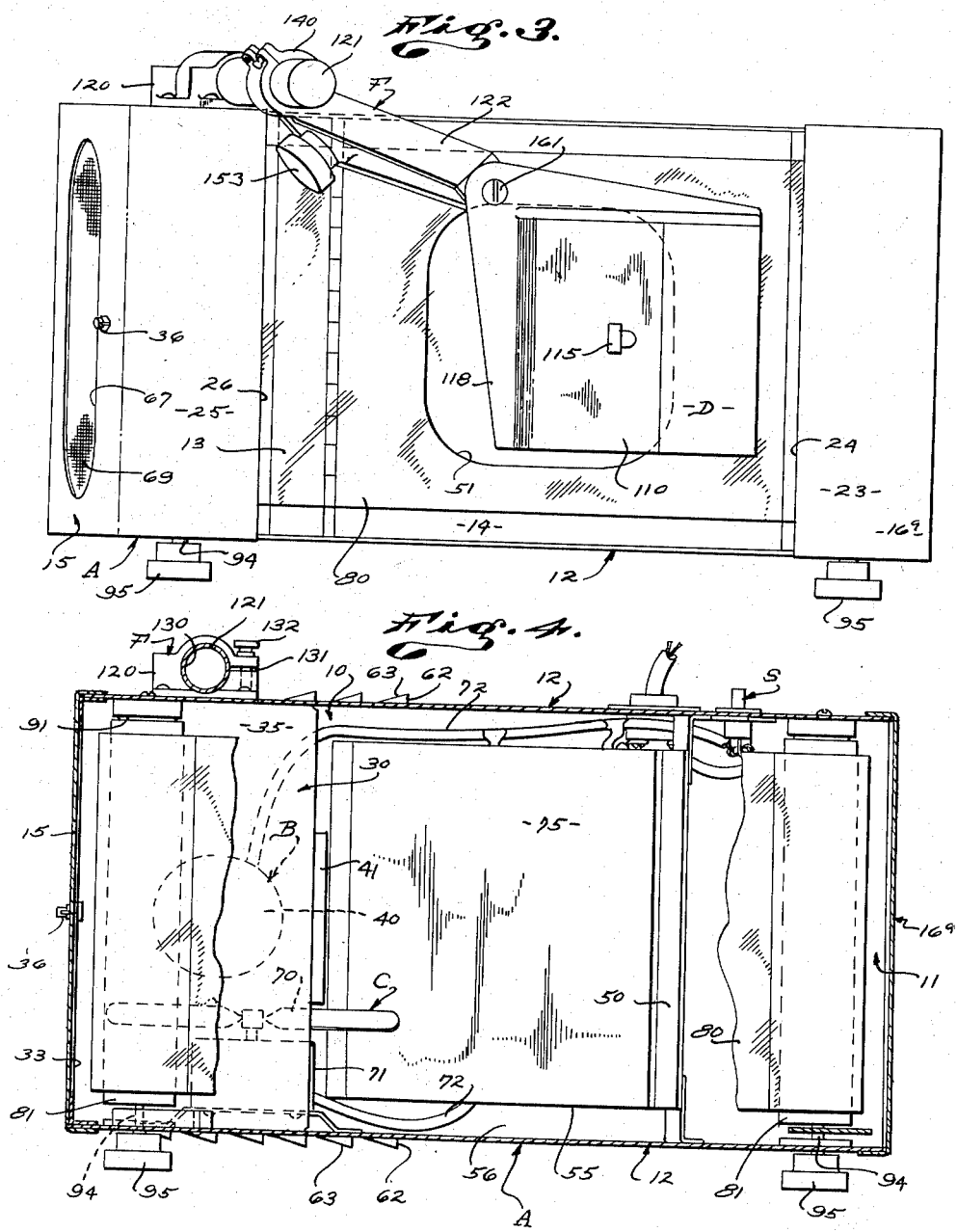

United States Patent Office 2,699,704
Patented Jan. 18, 1955

2,699,704

TRANSPARENCY AND PICTURE LIGHT PROJECTING DEVICE

Harold G. Fitz Gerald, Los Angeles, Calif.

Application April 30, 1951, Serial No. 223,750

6 Claims. (Cl. 88—24)

This invention relates to a light projecting device, it being a general object of the invention to provide a simple, compact, improved device for the projecting of light as through a transparency for the purposes of displaying or projecting an image of markings that occur on or which are applied to such transparency.

A general object of the present invention is to provide a light projector of the general character referred to in which the principal or essential elements are of simple form and in which the parts are arranged and related so that the structure as a whole is light, compact, and inexpensive of manufacture.

It is another object of this invention to provide a device of the general character referred to in which the transparency or web handled by the device is in the form of an elongate strip carried on spaced spools and in which the spools are mounted in or carried by the end portions of the body to be normally encased or enclosed within the body.

Another object of the present invention is to provide a device of the general character referred to having a body of improved form and construction with elements or portions pivoted to provide access to the spools that carry the transparency.

Another object of the invention is to provide a device of the general character referred to wherein the illuminating means characterized by a lamp and a reflector has these elements mounted on a pivoted carrier normally held in place by a pivoted element of the body and operable to a position where the elements of the illuminating means are readily removable for cleaning, replacement, or repair.

The structure provided by the present invention involves a box-like body having a bottom with a horizontal portion and an upwardly and forwardly projecting forward portion, sides that are flat and vertical and which project upwardly from opposite edges of the bottom, a top carried by and extending between the upper edges of the sides, a front wall and a rear wall. The bottom, sides and top of the body are preferably joined or secured together to form a rigid or fixed unit, while the front and rear walls have their lower edges pivoted or held by hinges so that these elements of the body can be swung out to provide access to the interior of the body at each end thereof. It is further preferred to provide a partition in the body at the rear end portion thereof dividing the rear of the body into a lower chamber and an upper compartment. Another partition occurs in the body and extends upwardly and forward from the horizontal section of the bottom. Illuminating means in the chamber at the rear of the body includes a lamp and a reflector serving to direct light forward toward the last mentioned partition and a reflector on that partition directs the light up and somewhat forward, so that it passes through an aperture in a hinged section of the top of the body. The lamp and reflector of the illuminating means are on a pivoted carrier and are normally held in operating position by the rear wall of the body when that wall is in closed position where it is normally held by a releasable latch. A cooling means in the form of a fan operated by a motor is provided in the body, and the lamp and fan motor are under control of a switch accessible at the exterior of the body. A transparency or web is preferably carried on spaced spools and these are releasably secured or mounted in the compartment at the upper end portion of the body and in the upper forward corner portion of the body. The mounting for the spool in the compartment involves a core and stop in fixed position, receiving one end of the spool, and a shiftable core and shiftable stop receiving the spool at its other end. A similar mounting supports the spool that occurs at the upper forward corner portion of the body. A light condenser is preferably carried by the pivoted section of the top and a light directing or projecting device is supported above the top to receive light directed through the transparency. The light projector may include a case or housing carrying a projector lens and a suitable reflector, and the housing is supported by an arm carried by a standard through an adjusting means by which suitable focus is effected. The standard is carried by a bracket at the exterior of the body, preferably at one side thereof, and toward the rear thereof, so that the standard and its mounting in no way interfere with the web and the working parts of the body, as hereinabove described.

The various objects and features of my invention will be fully understood from the following detailed description of a typical preferred form and application of the invention, throughout which description reference is made to the accompanying drawings, in which:

Fig. 1 is a view of the structure provided by the present invention, with parts thereof in section, the view being substantially a longitudinal vertical sectional view of the structure. Fig. 2 is an enlarged plan section taken as indicated by line 2—2 on Fig. 1. Fig. 3 is a plan elevation of the structure, being a view taken as indicated by line 3—3 on Fig. 1. Fig. 4 is a plan section being a view taken as indicated by line 4—4 on Fig. 1. Fig. 5 is an enlarged detailed sectional view taken as indicated by line 5—5 on Fig. 1. Fig. 6 is a transverse sectional view taken as indicated by line 6—6 on Fig. 5. Fig. 7 is an enlarged detailed sectional view of a portion of the structure taken as indicated by line 7—7 on Fig. 1. Fig. 8 is an enlarged detailed transverse sectional view of a portion of the structure taken as indicated by line 8—8 on Fig. 1, and Fig. 9 is an enlarged plan section taken as indicated by line 9—9 on Fig. 1.

The structure embodying the present invention involves, generally, a box-like body A, and the body, in its preferred form, has a bottom formed of a flat horizontal main section 10 and a forward section 11 that projects up and forward from the forward end of section 10. Side walls 12 project upwardly from the longitudinal edges of the bottom and are preferably flat, vertically disposed parts or plates. A top wall 13 is carried by and extends between the side walls 12 and it is preferably a flat plate-like structure supported so that it is pitched or inclined from a horizontal plane, it being preferred that the forward or foremost end of the top wall be somewhat lower than the rear end so that the top of the body is pitched somewhat like a disc. In the preferred construction, the top wall 13 includes a section 14 occupying a substantial portion of the top wall and carried by a pivot or hinge 16 so that it can be opened or swung up as will be indicated by the arrow X in Fig. 1.

The body further includes a rear end wall 15 located at and closing the rear end of the body. The rear wall 15 is mounted to provide access to the interior of the body and, in the preferred construction, it is carried by a pivot or hinge at 16, which hinge is located at the lower edge of the back wall so that the wall is joined to the rear edge of the bottom section 10. Through this construction the rear wall 15 of the body can be opened or swung out in the direction indicated by the arrow Y in Fig. 1. The body has a front wall 16ª closing the front or forward end of the body and this wall is carried by a pivot or hinge 17 that preferably connects the lower edge of wall 16ª to the foremost edge of the bottom portion 11. The construction is such that the front wall 16ª can be opened or swung out, as indicated by the arrow Z in Fig. 1.

In accordance with the present invention, it is preferred that the parts 10, 11, 12 and 13 of the body A be formed of sheet metal, and, in practice, these parts can be formed separately and suitably joined, as through flange connections 20, such as are indicated in the drawings. In the case of the top wall 13, it extends from one side wall 12 to the other but it is not as long as the body as a whole. At its forward end, the top wall 13 terminates at a downwardly or inwardly projecting flange 21 spaced rearwardly from the forward end of the body and at its rear end the wall 13 has a downwardly projecting flange 22 spaced forward of the rear end of the body. The front wall 16ᵃ has a rearwardly projecting lip 23 that extends rearwardly from its upper edge and terminates close to or just short of the flange 21, leaving an opening 24 to accommodate or pass the transparent sheet or web as will be hereinafter described. In like manner, a lip 25 projects forward from the suppermost edge of the rear wall 15 and terminates close to, but short of, flange 22, to leave an opening 26 for passing the web.

The body A further includes a partition 30, preferably located in the rear portion of the body where it is spaced between the bottom section 10 and top wall 13. The partition extends between the sides 12 and is secured thereto by flanges 31, and in the particular case illustrated it has an upwardly projecting flange 33 at its rear edge that is immediately inside the rear wall 15 when the rear wall is in closed position. The flange 33 materially stiffens the upper rear corner portion of the body and it is formed with a rather large opening 34 providing access from the rear of the body to the compartment 35 that occurs in the upper rear portion of the body or above partition 30. The flange 33 preferably carries a releasable latch or detent device 36 which receives and releasably retains the rear wall 15 in the closed position, as shown in Fig. 1 of the drawings. A downwardly projecting flange 27 extends from the forward edge of partition 30 to the bottom section 10 of the body to support and carry parts of the illuminating means hereinafter described.

Illuminating means B, provided in body A, involves, generally, a lamp 40 carried by a suitable socket 40ᵃ, a suitable condensing lens 41 in front of the lamp, and a reflector 42 rearward of the lamp and such as to direct a shaft of light forward through the lens 41, as indicated by the arrow in Fig. 1. Lens 41 is carried in an opening 38 in the flange 37 and is secured to the flange by means of suitable brackets 39. In accordance with the present invention, a carrier 43 is provided to support the socket 40ᵃ and the reflector 42. When the carrier is in the normal working position it is horizontally disposed and is located immediately above the bottom section 10, in which case the socket 40ᵃ projects upwardly from the carrier. The reflector 42 is secured to the carrier and projects upwardly therefrom. In the construction illustrated, a pivot or hinge 44 connects the rear edge of the carrier 43 to the bottom section 10 so that the carrier can be operated relative to the body or swung out as indicated by the arrow XX in Fig. 1. The construction that I have provided is such that when the rear wall 15 is swung open the carrier 43 can be swung out, making the reflector 42 and the lamp 40 readily accessible for cleaning, replacement, or repair. A stop 46 is provided on the back or rear wall 15 and when the wall 15 is in the closed position, as shown in Fig. 2, the stop 46 engages the reflector 42 and thus holds the assembly formed by the carrier and reflector in normal working position.

The body A has an additional partition 50 located forward of the lamp 40 and beneath the aperture 51 provided in the pivoted top wall section 14. The partition 50 is preferably a simple, flat plate anchored to the bottom section 10 of the body at 52 and extending upward and forward from the bottom section 10, as clearly shown in Fig. 1. In the preferred form of the invention, the side edges 55 of the partition 50 are spaced somewhat from the side walls 12, so that circulation openings 56 occur between the body and the sides of the partition 50.

In accordance with the present invention, circulation openings are provided in various parts or elements of the body A and in the preferred form of the invention a circulation opening 57 is provided in bottom section 10 beneath carrier 43 and a circulation opening 58 is provided in the bottom section 10 beneath partition 50. Circulation openings 59 are provided in the forward section 11 of the bottom and are preferably formed by cuts in this portion of the body where the body is deformed to provide louvers 60. Circulation openings 62 are provided in the side walls 12 where the walls are provided with louvers 63. A circulation opening 67 is provided in the rear wall 15 of the body, preferably at the rear of the reflector 42, and this opening is closed by a protective element or screen 69. In the preferred form of the invention air circulating means C is provided and preferably involves a fan 70 operated by a fan motor 71. In practice, the socket 40ᵃ carrying lamp 40 and fan motor 71 are energized by means of or through a common power line 72 under control of a switch S accessible at the exterior of the body.

A reflector 75 is mounted on or carried by the partition 50 and is such as to receive the light from lamp 40 and lens 41 and direct it upwardly through the aperture 51 in the section 14 of the top wall.

An element 80 through which light is to be projected and which I will refer to as a transparent sheet or web, is carried on spools 81 which are rotatably supported in the upper end corners of the body A so that the element 80 passes through the openings 24 and 26 and passes over the top of the top wall 13 of the body to cover the aperture 51. The element or strip 80 carries markings or is adapted to have markings applied thereto, which markings are to be projected by the apparatus, and although I will refer to the element 80 as transparent it is to be understood that it need not be clear or truly transparent, but rather, may be translucent, it being merely necessary, in practice, that it be such as to pass light for the purpose of projection in the manner common to devices of this character. In the form of the invention illustrated, the spools 81 onto which the end portions of the transparent web are wound, are tubular elements that may be formed of paper or the like. The spool 81 occurring in compartment 35 at the rear upper corner of the body has one end supported by a core 90 projecting into the spool and is positioned by a stop 91 opposing the end of the spool. The other end of this spool is positioned by a stop 92, and a core 93 is engaged in it and serves as a means by which the spool can be rotated. The core 93 is shown polygonal in form and is carried on a rotatable shaft 94 that projects through a wall of the case and is provided on its outer end with an operating knob 95. The stop 92 is spaced a suitable distance from stop 91 so that the spool 81 between the stops is confined in the desired position transverse of the body. Stop 91 is carried by the rear wall 51 of the body so that it is removed from the spool when the wall 15 is open, and the shaft 94 is shiftable axially so that the core 93 can be disengaged from the spool 81. Through the construction just described a spool 81 can be very easily installed in or removed from the upper rear corner portion of the body.

In like manner the spool 81 occurring at the forward upper corner of body A is supported at one end by a fixed core 90 and is positioned by a shoulder 91. At the other end it is supported by a shiftable core 93 on a shaft 94 provided with an operating knob 95, the same as hereinabove described. A stop 92 positions the spool at the forward end of the apparatus and is carried by the pivoted front wall 16 of the body.

A notable feature of the construction just described is the arrangement and relationship of parts which makes possible simple, quick introduction of web supporting spools into the upper forward corner portions of the body while a portion of the web or strip of material carried by the spools is engaged over the top wall 13 to register with the opening 51. The web and its supporting spools can be arranged in place without requiring any threading of the web through openings. When the spools have been properly mounted the end walls of the body can be moved to closed position, establishing the openings 24 and 26 which pass the web from the interior of the body to the top of wall 13, as clearly shown in Fig. 1 of the drawings.

In accordance with the invention, a light-directing element or condenser 100 is provided, preferably at the inner side of section 14 of the top wall 13. In the particular case illustrated the condenser involves a sheet or film of light condensing material 101 carried by the transparent plates 102 held at the inner side of wall section 14 by suitable brackets 103. The transparent plates or elements 102 may be of glass and the section 14 of wall 13 is preferably formed of thin sheet metal, so that the web or sheet 80 can be readily positioned against the uppermost member 102 so that that member forms a support for the web if it is desired to mark thereon.

The apparatus includes a light reflecting or projecting device D spaced above the top 13 of body A in the path of light passed by the web 80. In the particular case illustrated the projector D involves a suitable housing 110 carrying a projector lens 111 and a reflector 112. The reflector is pivoted at 113 and can be adjusted by operation of a screw 114 provided with an operating knob 115 at the exterior of housing 110. The front of the housing 110 is provided with an aperture 116 to pass light, and a transparent closure 117 is provided at the aperture 116. A base 118 on the housing 110 is suitably secured to a mounting means by which the light projector is supported in the desired position above the body.

The mounting means F for projector D involves, generally, a bracket 120 on the body A, a post 121 carried by the bracket and projecting above the body, and an arm 122 carried by the post and supporting the projector D. In accordance with the invention the bracket 120 is mounted on the exterior of the body A, preferably at one side 12 thereof and near the rear end portion of the body. In the case illustrated the bracket 120 has an opening or socket 130 that receives the lower end of the standard and the bracket is split at 131 and is provided with a clamp screw 132 so that it can be tightened or set in such manner as to rigidly hold the standard.

The standard may be a simple, straight, tubular part which projects a suitable distance above the body A. In the particular arrangement illustrated the bracket 120 is so positioned or inclined as to carry the standard 121 so that it projects upwardly in a direction normal to the plane of the top wall 13 of the body A. By locating the standard and its supporting bracket in the manner hereinabove described, these elements in no way interfere with other parts of the apparatus. By locating the standard as described and as shown in the drawings, the top of the body A can be of limited size, making the structure compact, and yet the standard in no way interferes with the mounting or manipulation of the web 80 handled by the apparatus. Furthermore, by locating the standard and its supporting bracket at one side of the body these parts in no way interfere with movement or operation of parts which shift or operate as hereinabove described.

The arm 122 is supported by the standard 121 so that it can be adjusted or shifted somewhat vertically in order to vary the spacing of the projector D above the body and thus effect focusing of the optical system. In the case illustrated the arm 122 has spaced collars 140 engaged around the standard 121. The collars are split and one is provided with a clamp screw 141 that can be set to establish a uniform frictional engagement with the standard. A hand operated clamp screw 142 is carried by the other collar and can be operated to set that collar on the standard 121 and thereby lock the arm in the desired position relative to the standard.

To facilitate movement of the arm along or relative to the standard, I provide a rack 150 on the exterior of the standard 121 which rack extends longitudinally of the standard. A pinion 151 is provided on a shaft 152 carried by the arm between the collars 140 and an operating knob 153 on shaft 152 makes it simple to rotate the shaft. The gear 151 meshes with the rack 150 so that by rotating the shaft 152 the arm is shifted relative to the standard.

In the preferred construction, faces 155 on the arm engage the sides of the rack 150 and thus prevent rotation of the arm on the standard. The arm is related to the standard through the construction just described so that it projects upward, forward, and inward to a point where it receives and holds the base 118 in a desired position above the body A. In the particular construction illustrated, the base 118 has a channel 160 that receives the upper end portion of the arm and a suitable fastener such as a screw 161 connects the base 118 and the arm holding these parts rigidly engaged in a fixed or predetermined position relative to each other.

From the foregoing description, it is believed obvious how the web or strip 80 carrying material to be projected, or on which markings are to be made, can be arranged in the apparatus, and it will be apparent that when the web and its supporting spools are in place and the end walls of the body A are closed, the supporting spools are housed or enclosed in the body and only the desired portion of the strip A is exposed or accessible, and this overlies the top wall 13 of the body. By operating the spools through the mounting means that I have provided it is possible to operate the web 80 in either direction. When the apparatus is in operation the lamp 40 is energized and the fan operated, with the result that there is adequate circulation of air inside the body keeping the parts of the structure cool and the light from the lamp 40 is handled by the reflector 42, lens 41, reflector 75, condenser 100, and projector D so that markings or images on the web 80 in register with aperture 51 are projected to be visible upon a suitable screen or other light surface. By opening or swinging the end walls of the body, the upper end corner portions of the body are made accessible so that web carrying spools can be removed and others inserted and whenever it is desired to clean, repair, or service, the interior of the body section 14 of the top wall can be swung out, and, if desired, the carrier 43 can be swung up.

The construction that I have provided is characterized by the body A which is formed of sheet metal and is unusually simple in form and construction, is compact, and is inexpensive of manufacture.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A light projecting device of the character described including, a box-like body having a bottom wall, a top wall, side walls, a front wall and a rear wall, means whereby the rear wall is pivotally connected to an adjoining part of the body providing access to the interior of the body at the rear portion thereof, the top wall having a pivotally mounted section with a light passing aperture therein normally covered by a light passing web, a light source in the body at the rear thereof accessible from the rear of the body when the rear wall is swung to an out position, and a reflector stationary in the body forward of the light source and adapted to receive light from said source and direct it up through the said aperture, the top wall being inclined so it is lower at the front of the body than at the rear thereof and providing access to the reflector when said section is swung open and the bottom wall having a rear horizontal section to which the rear wall is hinged and having a front section extending upward and forward from the rear section.

2. A light projecting device of the character described including, a box-like body having a bottom wall, a top wall, side walls, a front wall and a rear wall, means pivotally connecting an edge of the rear wall to an adjoining part of the body whereby the rear wall can be swung open to provide access to the interior of the body at the rear portion thereof, the top wall having a light passing aperture therein normally covered by a light passing web, a light source in the body at the rear portion thereof accessible from the rear of the body when the rear wall is swung to an out position, and a carrier supporting the light source and pivotally carried by the body and adapted to carry the light source to the exterior of the body when pivoted to an open position, the light source including a forwardly facing reflector in fixed position on the carrier and the rear wall engaging the reflector when in closed position holding the reflector in operating position.

3. A light projecting device of the character described including, a box-like body having a bottom wall with a horizontal rear section and an upwardly and forwardly extending front section, vertical side walls, a top wall with a hinged section having a light passing aperture therein, a front wall and a rear wall pivoted to the rear edge of the rear section of the bottom wall, a carrier pivoted in the body at the rear end portion thereof, a lamp on the carrier, a normally upright reflector on the carrier in fixed position thereon and rearward of the lamp, the said reflector being held in operating position by the rear wall when the rear wall is in position closing the rear of the body and an inclined reflector in the body forward of the lamp and adapted to direct light from the lamp up and through the said aperture.

4. A light projecting device of the character described including, a box-like body having a bottom wall with a horizontal rear section and an upwardly and forwardly projecting front section, vertical side walls, a flat forwardly and downwardly pitched top wall with a pivoted section having a light passing aperture therein, and front and rear walls pivoted at their lower edges and normally closing the ends of the body, a carrier pivoted to the bottom at the rear of the body, a socket on the carrier carrying a lamp, a forwardly facing reflector rigid on the carrier, and normally held in operating position by the rear wall, a partition in the body above the socket and reflector, an inclined reflector in the body below said aperture, a bracket on the exterior of one side wall, a standard carried by the bracket, an arm on the standard, and a light projector carried by the arm and projecting light passed by the aperture, a web, two spools with the web wound thereon, and spool mountings in the upper portion of the body at the ends thereof accessible when the front and rear walls are open.

5. A light projecting device of the character described including, a box-like body having a bottom wall with a horizontal rear section and an upwardly and forwardly projecting front section, vertical side walls, a flat forwardly and downwardly pitched top wall with a pivoted section having a light passing aperture therein, and front and rear walls pivoted at their lower edges and normally closing the ends of the body, a carrier pivoted to the bottom at the rear of the body, a socket on the carrier carrying a lamp, a forwardly facing reflector rigid on the carrier, and normally held in operating position by the rear wall, a partition in the body above the socket and reflector, an inclined reflector in the body below said aperture, a bracket on the exterior of one side wall, a standard carried by the bracket, an arm on the standard, and a light projector carried by the arm and projecting light passed by the aperture, a web, two spools with the web wound thereon, and spool mountings in the upper portion of the body at the ends thereof accessible when the front and rear walls are open, each spool mounting including, a fixed core and stop receiving one end of the spool and a shiftable core and a shiftable stop receiving the other end of the spool.

6. A light projecting device of the character described including, a box-like body having a bottom wall with a horizontal rear section and an upwardly and forwardly projecting front section, vertical side walls, a flat forwardly and downwardly pitched top wall with a pivoted section having a light passing aperture therein, and front and rear walls pivoted at their lower edges and normally closing the ends of the body, a carrier pivoted to the bottom at the rear of the body, a socket on the carrier carrying a lamp, a forwardly facing reflector rigid on the carrier, and normally held in operating position by the rear wall, a partition in the body above the socket and reflector, an inclined reflector in the body below said aperture, a bracket on the exterior of one side wall, a standard carried by the bracket, an arm on the standard, and a light projector carried by the arm and projecting light passed by the aperture, a web, two spools with the web wound thereon, and spool mountings in the upper portion of the body at the ends thereof accessible when the front and rear walls are open, each spool mounting including, a fixed core and stop receiving one end of a spool and a shiftable core and a shiftable stop receiving the other end of the spool, the shiftable cores being operable from the exterior of the body and the shiftable stops being carried by the front and rear walls of the body.

References Cited in the file of this patent

UNITED STATES PATENTS

| | | |
|---|---|---|
| 1,218,749 | Deming | Mar. 13, 1917 |
| 1,262,180 | Davies | Apr. 9, 1918 |
| 1,545,674 | MacKay | July 14, 1925 |
| 1,712,854 | Thonet | May 14, 1929 |
| 2,181,133 | Katz | Nov. 28, 1939 |
| 2,250,174 | Bancroft | July 22, 1941 |
| 2,310,273 | Bancroft | Feb. 9, 1943 |
| 2,330,799 | Cocker et al. | Oct. 5, 1943 |
| 2,496,647 | Woodbury | Feb. 7, 1950 |
| 2,529,664 | Roysher | Nov. 14, 1950 |

FOREIGN PATENTS

| | | |
|---|---|---|
| 487,281 | Germany | Dec. 6, 1929 |